United States Patent
Cherian et al.

(10) Patent No.: US 8,880,705 B2
(45) Date of Patent: Nov. 4, 2014

(54) SYSTEMS AND METHODS FOR DYNAMIC CREATION AND RELEASE OF PROXY MOBILE IP CONNECTIONS

(75) Inventors: George Cherian, San Diego, CA (US); Jun Wang, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 753 days.

(21) Appl. No.: 12/561,828

(22) Filed: Sep. 17, 2009

(65) Prior Publication Data

US 2010/0095007 A1    Apr. 15, 2010

Related U.S. Application Data

(60) Provisional application No. 61/105,707, filed on Oct. 15, 2008.

(51) Int. Cl.

| | |
|---|---|
| *G06F 15/16* | (2006.01) |
| *H04W 60/00* | (2009.01) |
| *H04W 88/18* | (2009.01) |
| *H04W 8/08* | (2009.01) |
| *H04W 80/04* | (2009.01) |

(52) U.S. Cl.
CPC .......... *H04W 60/005* (2013.01); *H04W 88/182* (2013.01); *H04W 8/087* (2013.01); *H04W 80/045* (2013.01)
USPC .......................................... 709/227; 709/230

(58) Field of Classification Search
CPC ............................. H04W 8/087; H04W 80/045
USPC ........................................................ 709/227
See application file for complete search history.

(56) References Cited

U.S. PATENT DOCUMENTS

| | | | |
|---|---|---|---|
| 2005/0020265 A1 | 1/2005 | Funabiki et al. | |
| 2007/0189219 A1* | 8/2007 | Navali et al. | 370/331 |
| 2007/0268919 A1* | 11/2007 | Sarikaya et al. | 370/401 |
| 2010/0037085 A1* | 2/2010 | Qiang | 714/2 |

FOREIGN PATENT DOCUMENTS

| | | |
|---|---|---|
| CN | 1985475 A | 6/2007 |
| JP | 2004007578 A | 1/2004 |

(Continued)

OTHER PUBLICATIONS

Gundavelli S et al: "Proxy Mobile IPv6; rfc5213.txt" Proxy Mobile IPV6; RFC5213.TXT, Internet Engineering Task Force, IETF; Standard, Internet Society (ISOC) 4, Rue Des Falaises CH-1205 Geneva, Switzerland, Aug. 1, 2008, XP015060252 sections 1-9, figures 1-13.

(Continued)

*Primary Examiner* — Emmanuel L Moise
*Assistant Examiner* — Xiang Yu

(57) ABSTRACT

Disclosed are systems, methods and computer program products for facilitating dynamic addition and release of IP addresses in an established Proxy Mobile IPv6 (PMIP) sessions, for example, based on the demand of a mobile device. An example method comprises receiving from the mobile device a request to add a second IP interface type to a current communication session associated with a first IP interface type, wherein the second IP interface type is different from the first IP interface type. The method further includes receiving from the home network a set of IP addresses of the second IP interface type and establishing one or more IP flows of the second IP interface type using one or more received IP addresses. The method further includes associating the one or more IP flows of the second IP interface type with the current communication session for the mobile device.

22 Claims, 11 Drawing Sheets

(56) References Cited

FOREIGN PATENT DOCUMENTS

| JP | 2004120270 A | 4/2004 |
|---|---|---|
| JP | 2006520548 A | 9/2006 |
| JP | 2007534251 A | 11/2007 |
| JP | 2008522482 A | 6/2008 |
| JP | 2008543198 A | 11/2008 |
| JP | 2009509368 A | 3/2009 |
| WO | 2004084492 A1 | 9/2004 |
| WO | 2005104480 A2 | 11/2005 |
| WO | 2006080758 A1 | 8/2006 |
| WO | 2006129136 A1 | 12/2006 |
| WO | 2007039007 A1 | 4/2007 |
| WO | WO2008013312 | 1/2008 |

OTHER PUBLICATIONS

International Search Report and Written Opinion—PCT/US2009/060893, International Searching Authority, European Patent Office, Mar. 16, 2010.

PREMEC Nokia Siemens Networks T Savolainen Nokia D: "Inter-technology handover in netlmm domain; draft-premec-netlmm-inter tech-handover-00.txt" Inter-Technology Handover in NETLMM Domain; draft-premec-netlmm-inter tech-handover-00.txt, Internet Engineering Task Force, IETF; StandardW0rkin6Draft, Internet Society (ISOC) 4, Rue Des Falaises CH-1205 Geneva, Switzerland, Apr. 26, 2008, XP015059733 abstract sections 1-9 figures 1-2.

Wakikawa Toyota ITC S Gundavelli Cisco R: "IPv4 Support for Proxy Mobile IPv6; draft-ietf-netlmm-pmip6-ipv4-support-05.txt" IPV4 Support for Proxy Mobile IPV6; draft-ietf-netlmm-pmip6-ipv4-supp ort-05.txt, Internet Engineering Task Force, IETF; StandardWorkingDraft, Internet Society (ISOC) 4, Rue Des Falaises CH-1205 Geneva, Switzerland, vol. netlmm, No. 5, Sep. 23, 2008, XP015058626 abstract sections 1-5 figure 1.

MIP6 WG, Internet-Draft, "Bindinq Revocation for IPv6 Mobility", draft-muhanna-mip6-bindinq-revocation-01.txt (May 29, 2007).

Taiwan Search Report—TW098134986—TIPO—Dec. 19, 2012.

* cited by examiner

IPV6 HEADER (SRC=PROXY-COA, DST=LMAA)

MOBILITY HEADER

- BU /* P & A FLAGS MUST BE SET TO VALUE 1 */

MOBILITY OPTIONS

- MOBILE NODE IDENTIFIER OPTION (MANDATORY)

- HOME NETWORK PREFIX OPTION(S) (MANDATORY)

- HANDOFF INDICATOR OPTION (MANDATORY)

- ACCESS TECHNOLOGY TYPE OPTION (MANDATORY)

- TIMESTAMP OPTION (OPTIONAL)

- MOBILE NODE LINK-LAYER IDENTIFIER OPTION (OPTIONAL)

- LINK-LOCAL ADDRESS OPTION (OPTIONAL)

FIG. 3

SYSTEMS AND METHODS FOR DYNAMIC CREATION AND RELEASE OF PROXY MOBILE IP CONNECTIONS

CLAIM OF PRIORITY UNDER 35 U.S.C. §119

The present Application for patent claims priority to Provisional Application No. 61/105,707 entitled "Support of Dynamic Addition and Release of IP Connections Over PMIP Based Network" filed Oct. 15, 2008, and assigned to the assignee hereof and hereby expressly incorporated by reference herein.

BACKGROUND

1. Field

This disclosure relates generally to the field of wireless communications and more specifically to the systems and methods for dynamically managing multiple connections in a mobile Internet Protocol (IP) network.

2. Background

Wireless communication systems are widely deployed to provide various types of communication content such as voice, data, multimedia and other. These systems may be multiple-access systems capable of supporting communication with multiple mobile devices by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, 3GPP Long Term Evolution (LTE) systems, and other types of wireless communication systems.

Most current wireless communication system support IP-based packet-switched networking for data and voice communications and, in particular, two most commonly used versions of the protocol, namely IPv4 and IPv6. Both versions of the protocol provide mobility support and allow mobile devices to remain reachable while moving between various wireless networks. In general, mobile IP allows a mobile device to move from one network to another without changing device's home addresses (HoAs), which are assigned to the mobile device by its home agent (HA), also known as a Local Mobility Anchor (LMA), residing in the home network. Packets may be routed to the mobile device using these addresses regardless of the mobile device's point of attachment in a foreign network.

For example, to remain reachable in IPv6 domain, a mobile device must create and maintain a binding between its HoAs assigned by the HA and its "care-of address" (CoA) in the foreign network by exchanging signaling messages with its HA, as provided by the Mobility Support IPv6 standard (RFC-3775). Alternatively, the binding may be created and maintained for the mobile device by the core IP network, as provided by the Proxy Mobile IPv6 (PMIP) standard (RFC-5213). In the latter approach, a proxy agent in the foreign network performs the signaling with the local mobility anchors in the home network and does the mobility management on behalf of the mobile device. In turn, local mobility anchors manage distribution of home addresses to the mobile devices, manage devices' binding states, and specify which services and applications are available to the mobile devices.

The network-centric mobility management approach provided by the PMIP standard (RFC-5213) has several advantages over the mobile-oriented approach (RFC-3775), some of which include shifting signaling/processing overhead from the mobile device to the core network, and reusing home agent functionality and the messages/format in mobility signaling. However, one of the limitations of the current PMIP standard is that it requires a mobile device to request all IP addresses for the lifetime of a PMIP session, at the time of the session setup. This generally aggravates the scarcity of IPv4 resources used by the home network, since the device may not use all the requested IP addresses during the lifetime of the PMIP session. In other words, the mobile device must be able to request to add/release IP addresses on a need-basis without affecting other services of the existing PMIP session.

SUMMARY

The following presents a simplified summary of one or more aspects of the invention in order to provide a basic understanding of the invention. This summary is not an extensive overview of all contemplated aspects of the invention, and is intended to neither identify key or critical elements of the invention nor delineate the scope of any or all aspects thereof. Its sole purpose is to present some concepts of one or more aspects of the invention in a simplified form as a prelude to the more detailed description that is presented later.

In accordance with one or more aspects of the invention and corresponding disclosure thereof, various aspects are described in connection with facilitating a communication system to dynamically add and release IP addresses in an established Proxy Mobile IPv6 (PMIP) sessions. An example method comprises receiving from a mobile device a request to add a second IP interface type to a current PMIP communication session associated with a first IP interface type, wherein the second IP interface type may be different from the first IP interface type; requesting from the home network of the mobile device a set of IP addresses of the second IP interface type; receiving from the home network a set of IP addresses of the second IP interface type; establishing one or more IP flows of the second IP interface type using one or more received IP addresses; and associating the one or more IP flows of the second IP interface type with the current PMIP communication session for the mobile device.

To the accomplishment of the foregoing and related ends, the one or more aspects of the invention comprise the features hereinafter fully described and particularly pointed out in the claims. The following description and the annexed drawings set forth in detail certain illustrative features of the one or more aspects of the invention. These features are indicative, however, of but a few of the various ways in which the principles of various aspects may be employed, and this description is intended to include all such aspects and their equivalents.

BRIEF DESCRIPTION OF THE DRAWINGS

The disclosed aspects of the invention will hereinafter be described in conjunction with the appended drawings, provided to illustrate and not to limit the disclosed aspects, wherein like designations denote like elements, and in which:

FIG. 3 illustrates a proxy binding update (PBU) message in accordance with the Proxy Mobile IPv6 standard (RFC-5213).

DETAILED DESCRIPTION

Figure 1:
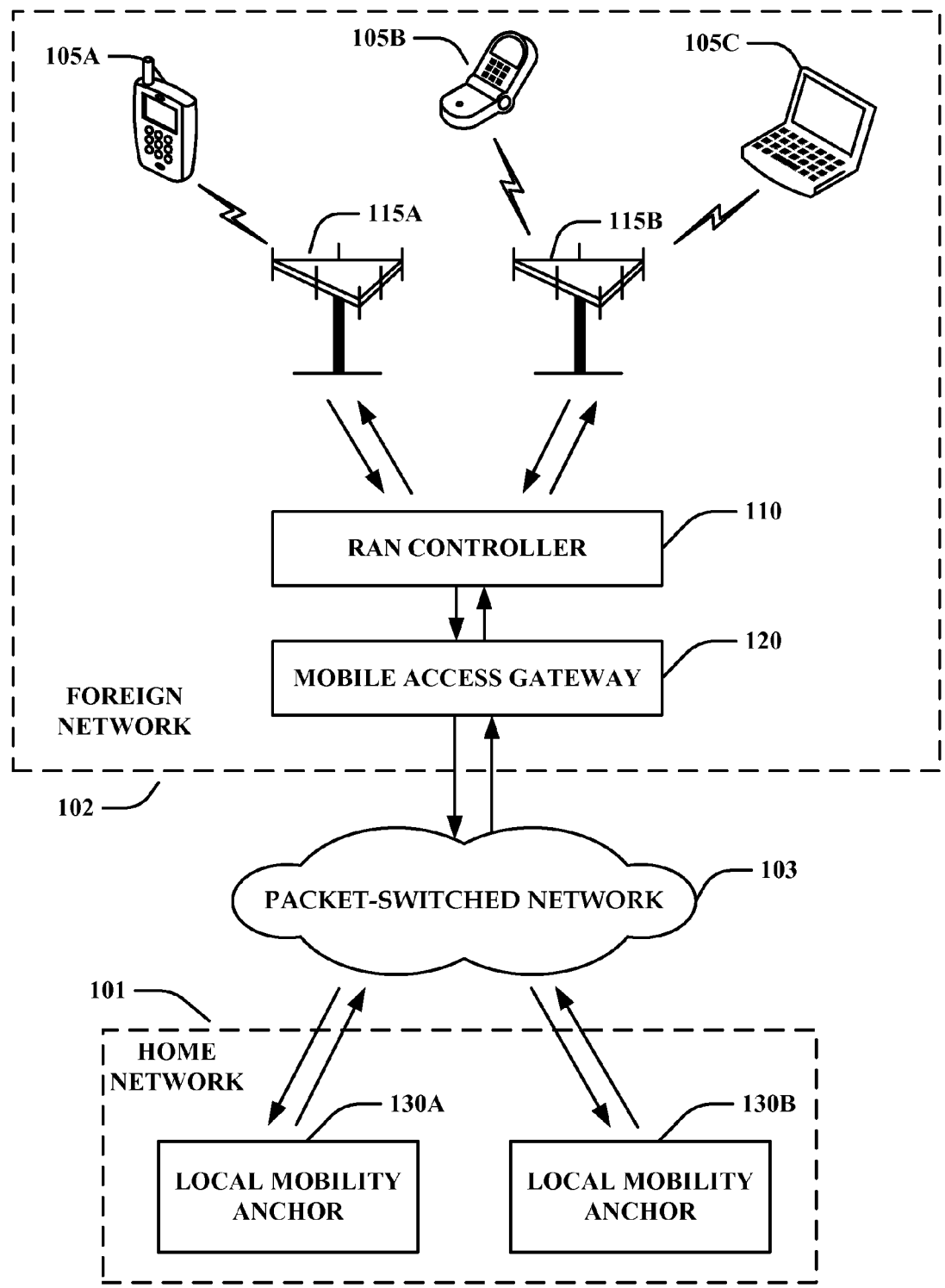
FIG. 1 is an illustration of a wireless communication system in accordance with various aspects of the invention set forth herein.

Various aspects of the invention are now described with reference to the drawings. In the following description, for purposes of explanation, numerous specific details are set forth in order to provide a thorough understanding of one or more aspects of the invention. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects of the invention are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a personal digital assistant (PDA), a handheld device having wireless connection capability, a laptop computer, or other processing device connected to a wireless modem.

Moreover, various aspects or features of the invention described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features of the invention will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various aspects of the invention presented herein. System 100 comprises one or more home networks 101 for a plurality of mobile devices 105 and a foreign network 102 in which the mobile devices 105 are currently located. Home network 101 and foreign network 102 may be connected via a packet-switched network 103, which transports data using the Internet Protocol (IP). Foreign network 102 may be a radio access network (RAN), such as CDMA2000 or any other type of wireless communication system. Generally, foreign network 102 may include a RAN controller 110, a plurality of radio base stations 115 and a mobile access gateway (MAG) 120. Radio base stations 115 may include multiple antenna groups and/or a transmitter/receiver chain that can in turn comprise a plurality of components associated with radio signal transmission and reception (e.g., processors, modulators, multiplexers, antennas, etc. (not shown)) to and from the mobile devices 115. Home network 101 may be a wireless or wired network and may include a plurality of local mobility agents (LMA) 130, which function as home agents (HA) 130 in a proxy mobility network.

More specifically, foreign RAN 102 provides wireless connectivity to mobile device 115 for accessing services provided by the LMAs 130 in the home networks 101. RAN controller 110 is network equipment providing data connectivity between mobile devices 115 and the MAG 120. The main functions of the RAN controller 110 include establishment, maintenance, and termination of radio channels; radio resource management; and mobility management. The radio channels between mobile devices 115 and RAN controller 110 are known as radio link protocol (RLP) flows. Mobile device 115 generally negotiates a reservation with RAN controller 110 for a different RLP flow for different services provided by the LMAs 130 in its home network 101, as will be described in greater detail herein below. In one example, RAN controller 110 supports a Packet Control Function (PCF), which controls the transmission of packets between the RAN controller 110 and the MAG 120 using bearer connections through an A10 data interface and an A11 signaling interface.

Mobile Access Gateway (MAG) 120 is a server or router that connects radio and core IP networks. MAG 120 is responsible for tracking the mobile devices' movements to and from the foreign network 102, aggregating data traffic from multiple RAN controllers and providing access to a packet-switched network 103, such as the Internet, intranets, and home networks 101 for mobile devices 115 that use CDMA2000 or other radio access technology. MAG 120 may be implemented as a Packet Data Serving Node (PDSN) in one aspect of the invention. If system 100 supports Mobile IPv4 and Proxy Mobile IPv6 protocols, MAG 120 serves as a proxy agent for mobile IPv4 and IPv6 packet transport, signaling and data transmission/reception to/from mobile devices 115 and their LMAs 130. In particular, when data packets are received through the A10/A11 bearer connection from mobile device 115, MAG 120 identifies LMA 130 in the home network 101 of mobile device 115 using binding state information associated with the device's home address (HoA), creates a bidirectional proxy mobile IP (PMIP) tunnel with the device's LMA 130, encapsulates the received data in a new packet with MAG's source address as a proxy CoA, and transmits the encapsulated packets through the PMIP tunnel to the appropriate LMA. When data packets are received from LMA 130, MAG 120 de-encapsulates them based on the binding state information associated with the LMA 130 and forwards them through the appropriate bearer connection to the mobile device 115. MAG 120 may also provide Authentication, Authorization and Accounting (AAA) services for the mobile device 15 and the other administrative services.

Local Mobility Anchor (LMA) 130 is the topological anchor point for the mobile device's home network prefix(es) and is the entity that manages the mobile device's binding state. Binding is the association of the mobile device's HoAs in the home network 101 with its Proxy CoA in the foreign network 102, e.g., IP address of MAG 120. HoAs are the addresses from a mobile device's home network prefixes specified by the LMAs 130. Mobile devices 115 can use multiple HoAs for its various IP interfaces, for instance when there are multiple home prefixes provided by LMA 130. If the mobile device uses more than one address from its home network prefixes, any one of these addresses is referred to as mobile device's home address. Mobile device 115 typically uses different HoAs for different communication sessions with its LMAs. In this manner, mobile device 115 may have multiple active IP interfaces (e.g., applications, services, programs) identified by different HoA. Furthermore, IP interfaces may be of different type, such as IPv4 and IPv6 interfaces. Each IP interface may have one or more separate IP flows associated therewith. One or more IP flows may be transported between MAG 120 and LMAs 130 using one or more PMIP tunnels. IP flows of different types may be transported in the same or different PMIP tunnels.

The current PMIP standard requires a mobile device to request and the LMA to provide all IP addresses (e.g., IPv4 and IPv6 prefixes) necessary for the lifetime of a PMIP session at the time of the session setup. This generally aggravates the scarcity of IPv4 resources available on the home network, since the mobile device may not use all the requested IP addresses during the lifetime of a PMIP session. The methodologies disclosed herein enable a mobile device, as well as the MAG and LMAs, to dynamically add and release IP addresses during a PIMP session.

Figure 2:
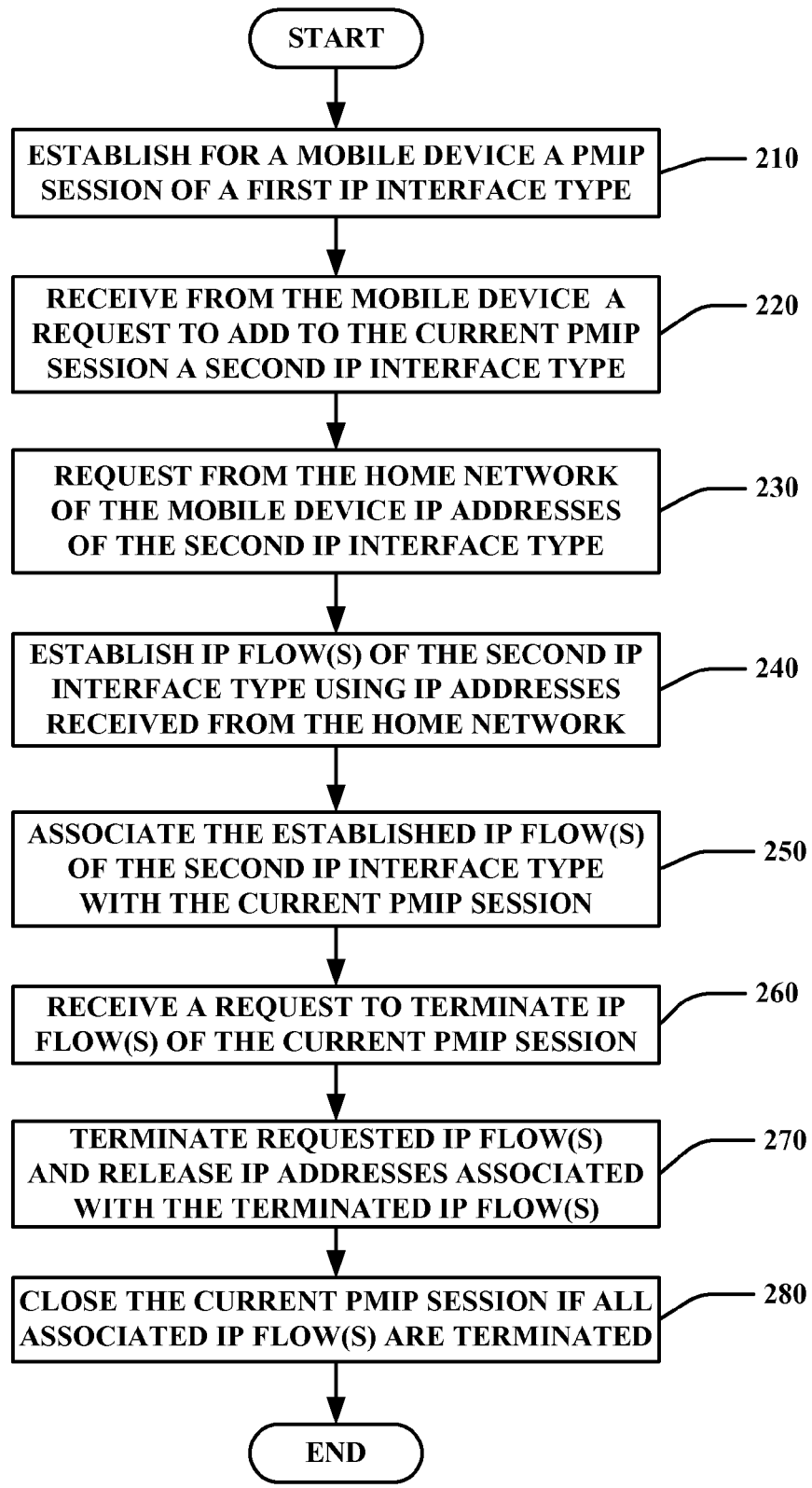
FIG. 2 is an illustration of an example methodology for dynamically managing IP connections in a wireless communication environment.

FIG. 2 depicts one example of the methodology for dynamic allocation and release of IP addresses in an existing PMIP session (e.g., a PMIP tunnel). At step 230, upon request from the mobile device 115, MAG 120 establishes with LMA 130 a PMIP session associated with a first IP interface type (e.g., IPv4). At step 220, MAG 120 may receive a request from the mobile device 115 to add a new IP interface type to the current PMIP session. At step 230, MAG 120 may request from LMA 130 in the home network 101 of the mobile device 115 a set of IP addresses of the second IP interface type (e.g., IPv6). At step 240, receives the requested IP addresses and establishes for the mobile device 115 one or more IP flows of the second IP interface type using one or more received IP addresses. At step 250, MAG 120 associates the one or more IP flows of the second IP interface type with the current PMIP session for the mobile device 115 and begins to transmit IPv6 traffic to/from mobile device 115 and LMA 130. At step 260, MAG 120 receives a request to terminate one or more IP flows associated with mobile device 115. At step 270, MAG 120 terminates these IP flows and releases IP addresses associated with the terminated IP flows. At step 280, MAG 120 closes the current PMIP session if all IP flows associated therewith have been terminated.

More specifically, the methodology enables a mobile device 115 to explicitly and dynamically request a new IP interface type, such as an IPv4 and/or IPv6 interface type, for an existing PMIP session. An indicator of the new IP interface type may be added as a parameter to the IPCP-Config-Req messages, which are used by the mobile device 115 to request IPv4 addresses from the MAG 120, and to the IPv6CP-Config-Req messages, which are used to request IPv6 addresses to request additional IP addresses of the same type. In addition, a new vendor specific option may be added to the proxy binding update (PBU) message, which is depicted in FIG. 3, which is sent by MAG 120 to LMA 130 in response to the IPCP-Config-Req/IPv6CP-Config-Req messages from the mobile device 115. The new vendor specific option would indicate to LMA 130 that MAG 120 requests a new type of IP addresses, or a new IP address of an existing IP address type for the existing PMIP session with the mobile device 115. In response to the PBU message with such an option, LMA 130 may assign a new set of IP addresses (e.g., IPv4 or IPv6 prefixes) to the mobile device 115 and send the same to MAG 120 in a PBA message. In response, MAG 120 may set up new IP flows for communication of the new type of IP traffic using new or existing PMIP tunnels for the existing communication session with the mobile device 115.

When the mobile device 115 decides to terminate IP connection of a particular type(s), e.g., IPv4 and/or IPv6 connections, the device may send an IP terminate sequence to MAG 120, which in turn may release IP addresses associated with the terminated IP connection(s). In one aspect, MAG 120 may send to the LMA 130 a PBU message with the mobile device's HoA(s) and the lifetime parameter of these addresses set to ZERO. When the proxy binding acknowledgement (PBA) comes from LMA 130, MAG 120 may release IP addresses (i.e., prefixes) associated with the terminated IP connection(s). In addition, if MAG 120 detects that there are no other IP flows associated with the PIMP tunnel for which IP connection(s) has been terminated, the MAG 120 may delete that PIMP tunnel as well.

In another aspect, instead of using a new vendor specific option to inform LMA 130 of a new IP interface type request, MAG 120 may use standard options provided in the extended PBU messages in a new way. According to this methodology, upon receiving a request from the mobile device 115 to add a new IP interface type to the current PMIP session, MAG 120 may send to LMA 130 a PBU with multiple Home Network Prefix options (depicted in FIG. 3) listing all existing addresses (i.e., already assigned ones) and including ALL_ZERO value for new type of home network prefixes. The ALL_ZERO value will indicate to the LMA 130 that MAG 120 requests a new type of IP addresses for the mobile device 115. In response, LMA 130 may allocate the requested IP addresses, and send back to MAG 120 a PBA containing all the IP addresses that are allocated to the mobile device 115. If the LMA failed to assign a new IP address, then the LMA will set the IP address to ALL_ZERO for the newly requested IP address.

Upon request from the mobile device 115 to release one or more IP address, MAG 120 may send a PBU message that includes all existing IP addresses but excludes the ones to be deleted. MAG 120 may also add one more parameter to the Handoff Indicator option to indicate that the PBU message is an "update to existing interface". In response to such a message, LMA 130 may deallocate the IP addresses as requested, and send back to MAG 120 a PBA with the list of IP addresses containing all the IP addresses that are currently allocated on the PMIP tunnel. MAG will use this indication as an additional confirmation of validity of the existing IP addresses that are not deleted. If any IP address that are not excluded from the request is excluded in the response, then the MAG will treat it as an unsolicited IP address release by LMA. Alternatively, upon request from the mobile device 115 to release IP addresses, MAG 120 may send a PBU message just including the IP addresses that needs to be deleted and set the lifetime parameter associated with these addresses to ZERO. In response, LMA 130 may deallocate the IP address by sending PBA message to MAG 120.

In another aspect on the invention, LMA 130 may initiate release of certain IP address associated with the mobile device 115 by sending to MAG 120 an extended Binding Revocation Indication (BRI) message with an indicator "selective IP address release" added in a Revocation Trigger option and include a list of IP addresses that are to be deleted to the Mobility option in the BRI message. Other methodologies known to those of skill in the art may be used to release IP addresses assigned to the mobile device 115 by the home network.

In one aspect, the new type of IP traffic may be setup using a new or existing PMIP tunnel of the current communication session. The decision to use the existing PMIP tunnel or to create a new PMIP tunnel may be made by MAG 130 based on, for example, the QoS requirements of the new IP interface type or other application- or network-dependent parameters. In one aspect, if the mobile device 115 having existing IPv4 connections requests a new IPv6 interface type using methodologies disclosed herein, and the QoS requirements for the new IPv6 connections are the same as the QoS requirements for the existing IPv4 connections, MAG 120 may associate the new IPv6 interface type with the existing PMIP tunnel that transports IPv4 traffic from the mobile device 115 and to send new IPv6 traffic using the existing PMIP tunnel of the current communication session. If however, the IPv6 interface type request comes from an application on the mobile device 115 that requires a different QoS treatment then the one provided by the existing PMIP tunnel, MAG 120 may create a new tunnel to transport data of the new IP interface type. In this manner, MAG 120 may set up different PMIP tunnels for communicating IPv4, IPv6 and IPv4/IPv6 traffic to/from the mobile device 115 within the same communication session.

Figure 4:
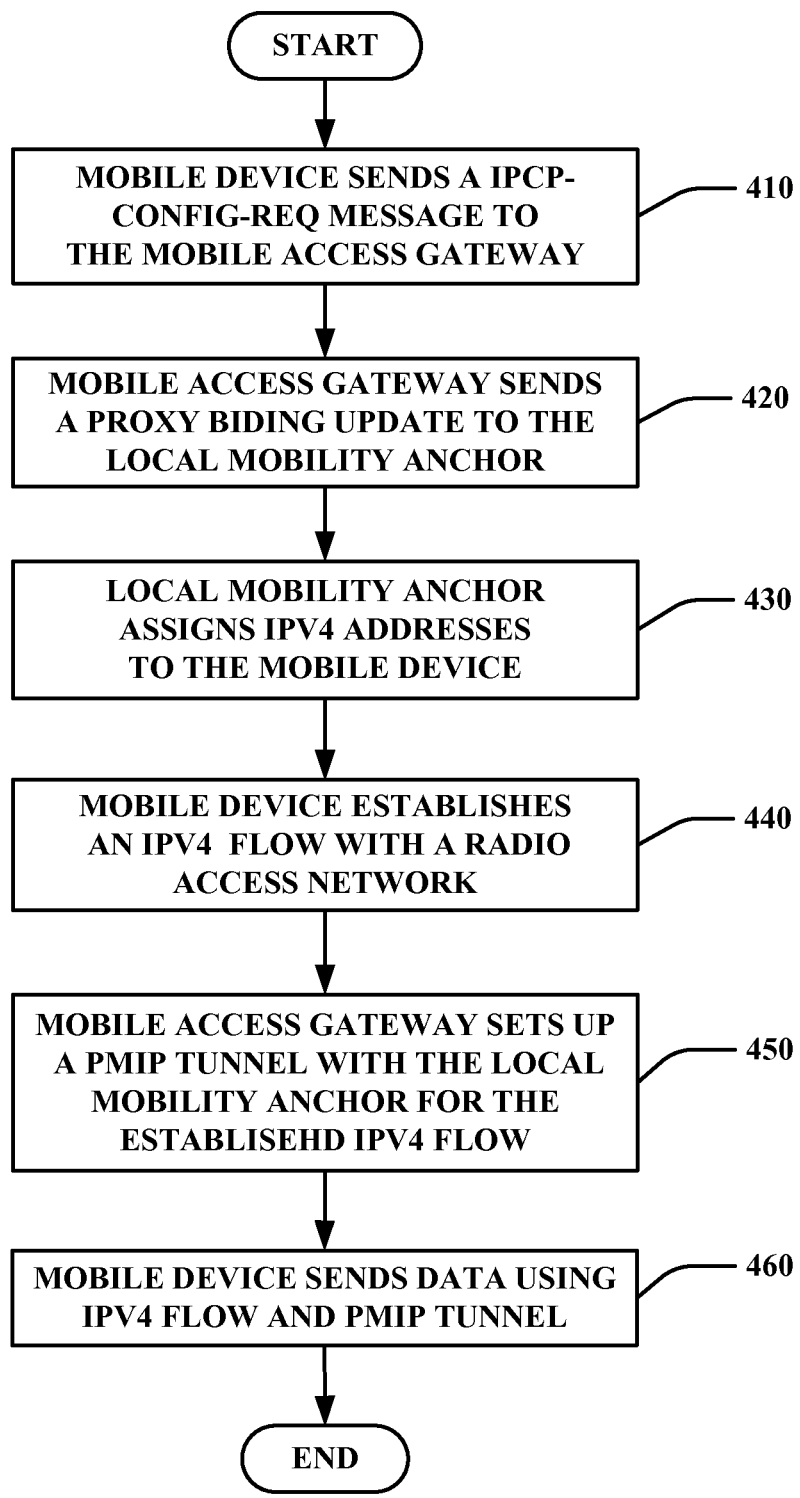
FIG. 4 is an illustration of an example methodology for establishing IPv4 connections in a wireless communication environment.

FIG. 4 depicts one example methodology for establishing an initial IP connection in a wireless communication environment. At step 410, mobile device 115 may send an IPCP-Config-Req message to the MAG 120 requesting IPv4 addresses for one of its IP interfaces (e.g., applications, services or programs). At step 420, MAG sends a PBU to the appropriate LMA in the device's home network 101 requesting IPv4 addresses for the mobile devices 115. At step 430, LMA 130 assigns and returns to MAG 120 a PBA with a set of IPv4 address (i.e., prefixes), which MAG 120 forwards to the mobile device 115. At step 440, mobile device 115 sets up a communication session for one of its IP interfaces using one or more IPv4 addresses by first negotiating with RAN 110 for one or more IPv4 flows (e.g., RLP flows). The RAN in turn may set up respective bearer connections (e.g., A10/A11 connections) to MAG 120. At step 450, MAG 120 set up a first PMIP tunnel with LMA 130 for communication of IPv4 data from the mobile device 115 using one or more of the assigned IPv4 addresses. Once the tunnel is established, at step 460, MAG 120 sends IPv4 traffic to/from the mobile device 115 and LMA 130 thought the established PMIP tunnel.

Figure 5:
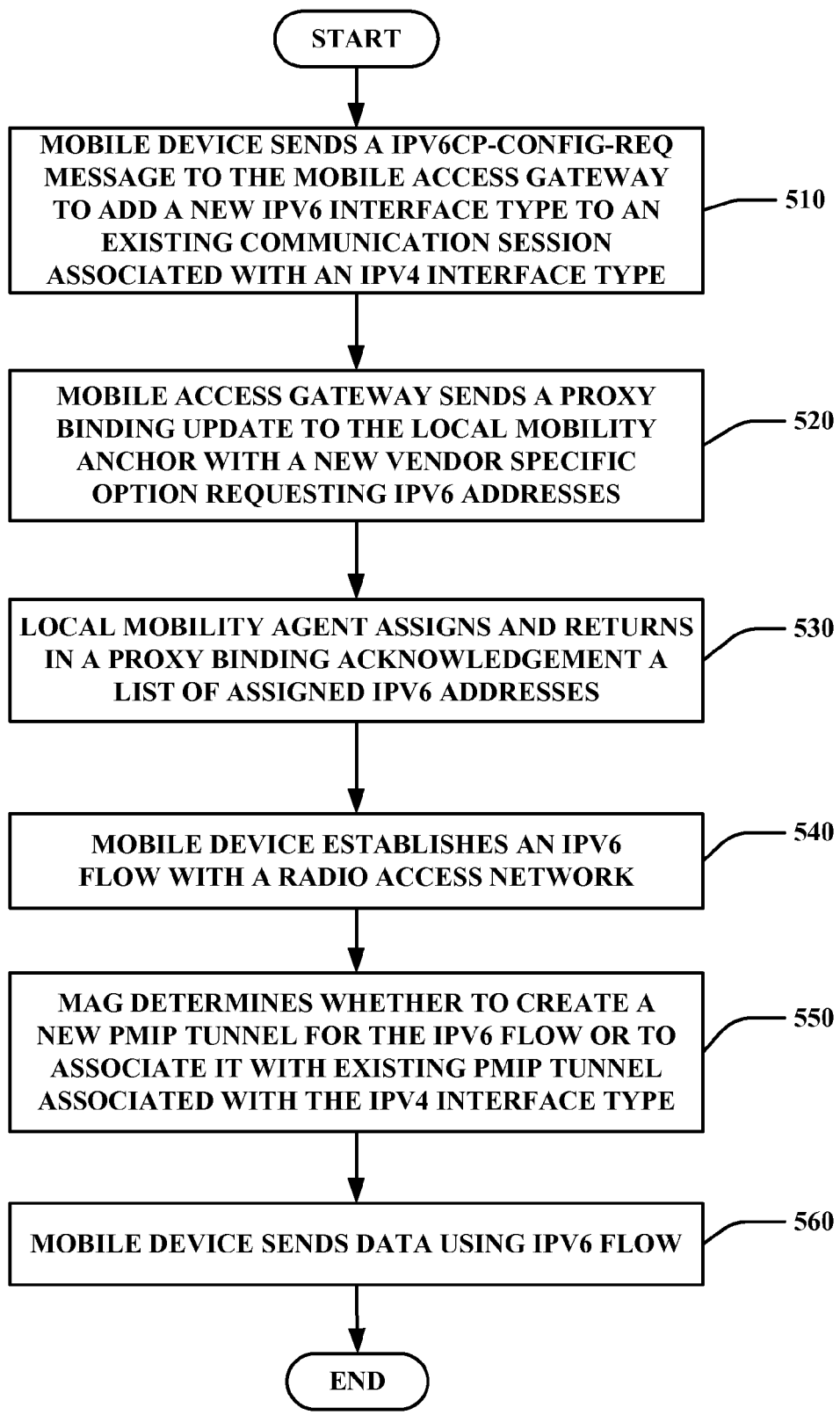
FIG. 5 is an illustration of an example methodology for dynamically adding IPv6 connections in a wireless communication environment.

FIG. 5 depicts one example methodology for dynamically adding to an existing PMIP communication session of a first IP interface type new IP connections of a second IP interface type. At step 510, mobile device 115 sends using one of the previously assigned IPv4 addresses an IPv6CP-Config-Req message to MAG 120 with the explicit interface-type parameter indicating a request for the IPv6 address assignment to the current communication session. At step 520, MAG 120 sends to the appropriate LMA 130 in the home network 101 a PBU with a new vendor-specific option requesting assignment of IPv6 addresses to the mobile device 115. At step 530, LMA 130 assigns and returns to the MAG 120 a PBA with a set of IPv6 addresses (i.e., prefixes), which MAG 120 forwards to the mobile device 115. At step 540, mobile device 115 negotiates with RAN 110 for one or more IPv6 flows for its IPv6 interfaces for the current communication session using one or more of the assigned IPv6 addresses. At step 550, MAG 120 determines whether to associate the one or more IPv6 flows with the existing PMIP tunnel used for transmission of IPv4 traffic or to create a new PMIP tunnel for the IPv6 traffic from the mobile device 115. At step 560, MAG 120 begins transporting IPv6 traffic to/from the mobile device 15.

Figure 6:
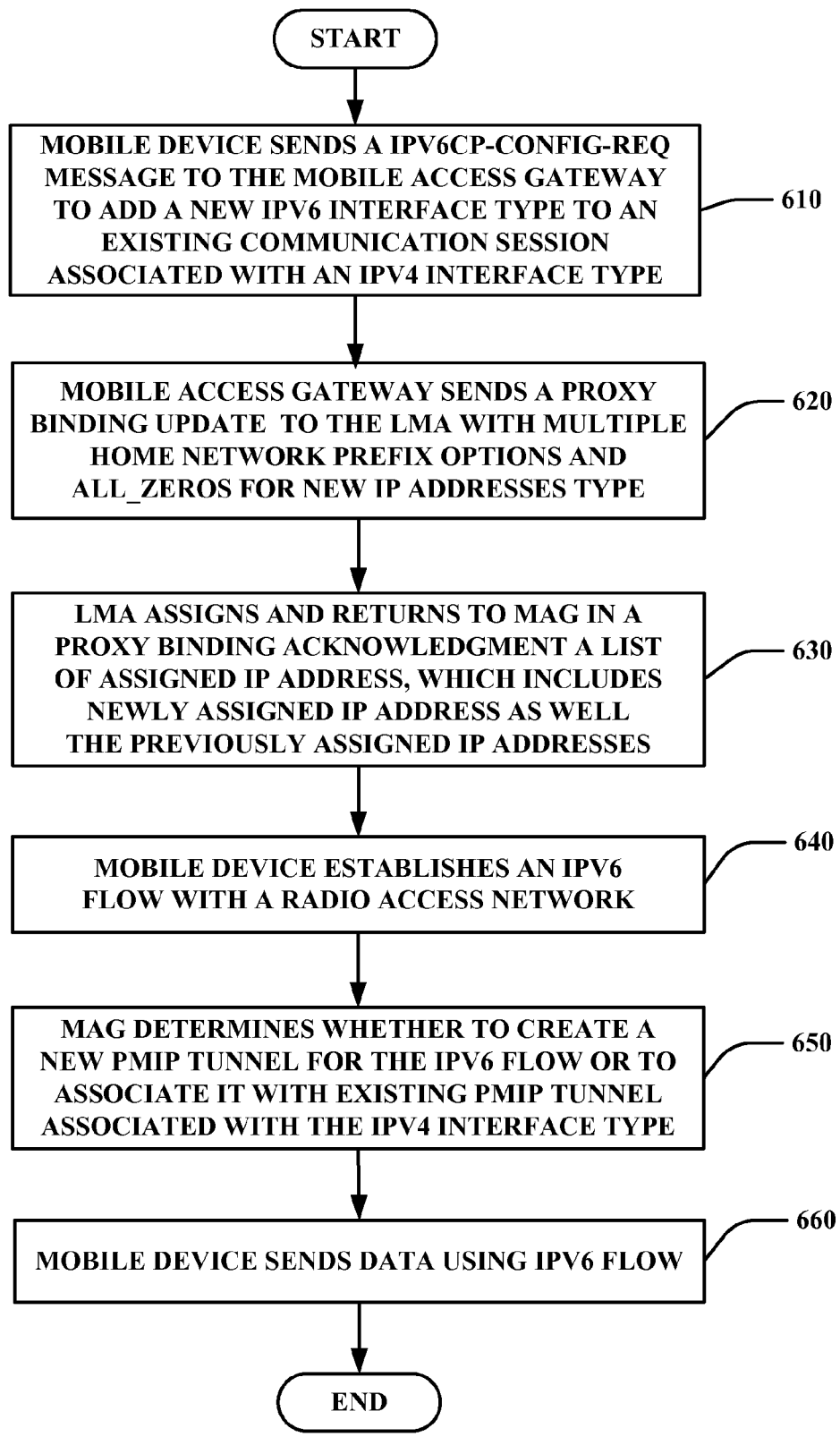
FIG. 6 is an illustration of another example methodology for dynamically adding IP connections in a wireless communication environment.

FIG. 6 depicts another methodology for dynamically adding to an existing PMIP communication session of a first IP interface type new IP connections of a second IP interface type. At step 610, mobile device 115 sends using one of the previously assigned IPv4 address an IPv6CP-Config-Req message to the MAG 120 with the explicit interface-type parameter indicating a request for the IPv6 address assignment to the current communication session. At step 620, MAG 120 may send to LMA 130 a PBU with multiple Home Network Prefix options listing all existing addresses (i.e., already assigned ones) and including ALL_ZERO value for new type of home network prefixes. At step 630, LMA 130 assigns and returns to MAG 120 in a PBA a list of assigned IPv6 address (i.e., prefixes), which includes newly assigned IPv6 addresses as well as the previously assigned IPv4 addresses. MAG 120 may provide the mobile device 115 one or more of the assigned IP address upon request from the mobile device 115. At step 640, mobile device 115 negotiates with RAN 110 for one or more IPv6 flows for its IPv6 interfaces for the current communication session using one or more of the assigned IPv6 addresses. At step 650, MAG 120 decides whether to associate the one or more IPv6 flows with the existing PMIP tunnel used for transmission of IPv4 traffic or to create a new PMIP tunnel for the IPv6 traffic. At step 660, MAG 120 begins transporting IPv6 traffic to/from the mobile device 15.

Figure 7:
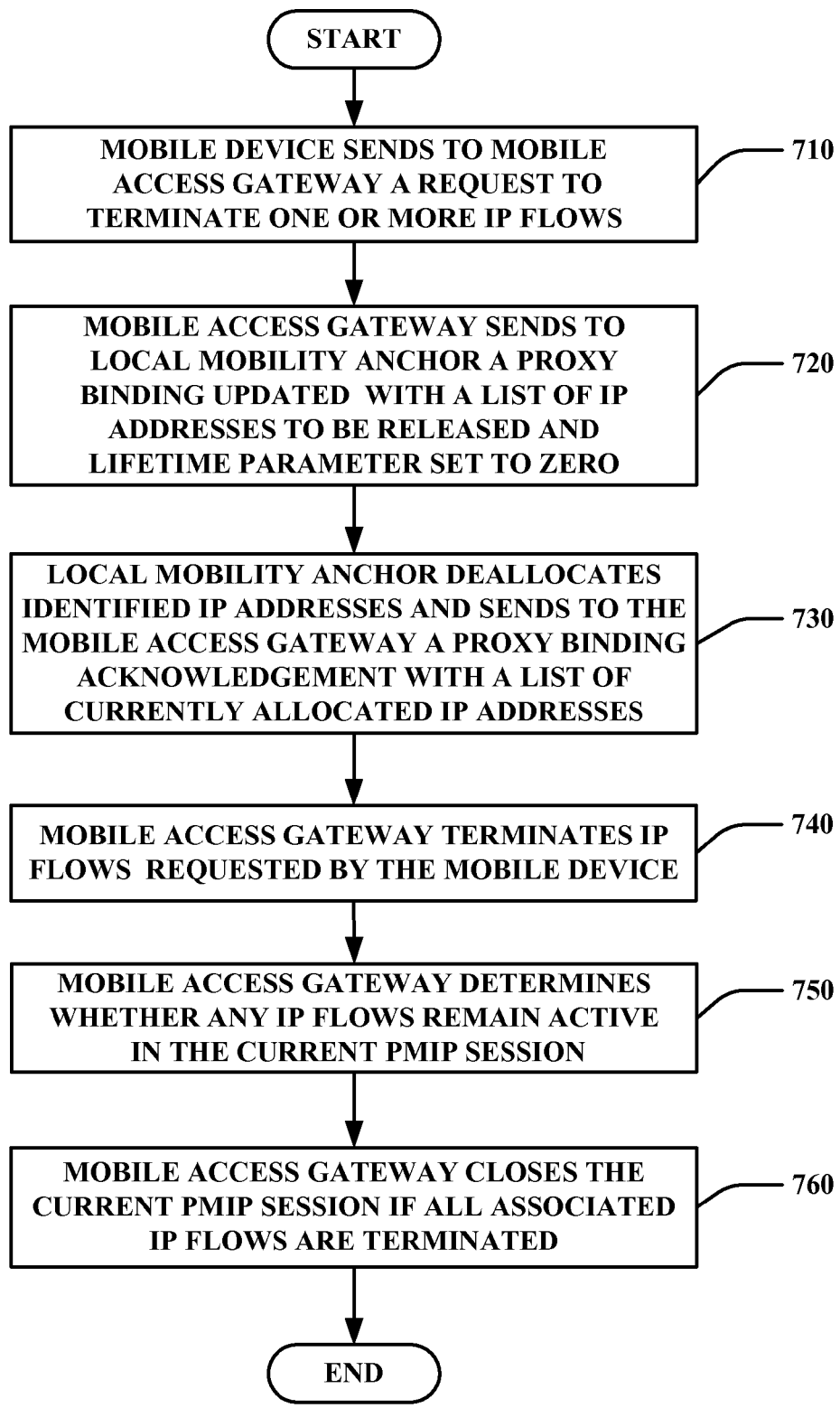
FIG. 7 is an illustration of an example methodology for dynamically releasing IP connections in a wireless communication environment.

FIG. 7 depicts an example methodology for dynamically releasing IP connections in a wireless communication environment. At step 710, MAG 120 receives from the mobile device 115 a request to terminate one or more IP flows (e.g., IPv4 and/or IPv6 flows) associated with a current PMIP session. At step 720, MAG 120 generates and sends to LMA 130 a PBU message with a list of IP address for which connections have been terminated by the mobile device 115 and sets the lifetime parameter of these IP addresses to ZERO. In response to this message, at step 730, LMA 130 deallocates the identified IP addresses and sends back to MAG 120 a PBA with the list of currently allocated IP addresses. MAG 120 will use this indication as an additional confirmation of validity of the existing IP addresses that are not deleted. If any IP address that are not excluded from the original IP flow termination request is excluded in the PBA, then MAG 120 may treat it as an unsolicited IP address release by LMA 130. At step 740, MAG 120 terminates all IP flows requested by the mobile device and those requested by LMA 130. At step 750, MAG 120 determines whether any IP flows remain active in the current PMIP session. At step 760, MAG 120 may close the current PMIP session if there are no active IP flows remain associated therewith.

Figure 8:
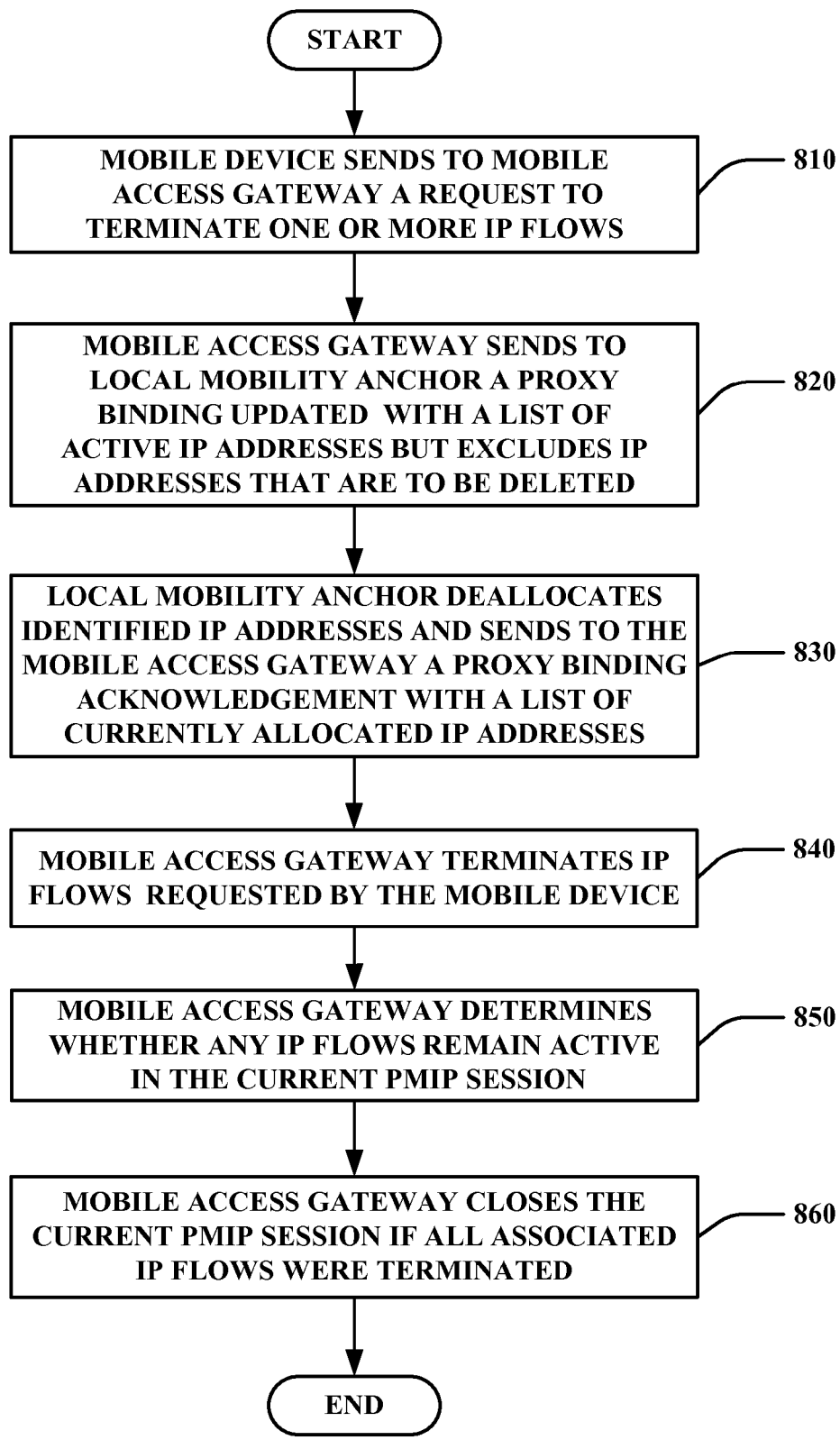
FIG. 8 is an illustration of another example methodology for dynamically releasing IP connections in a wireless communication environment.

FIG. 8 depicts another example methodology for dynamically releasing IP connections in a wireless communication environment. At step 810, MAG 120 receives from the mobile device 115 a request to terminate one or more IP flows (e.g., IPv4 and/or IPv6 flows) associated with a current PMIP session. At step 820, MAG 120 generates and sends to LMA 130 a PBU message that lists all existing IP addresses for the PMIP session but excludes the ones to be deleted. At step 830, LMA 130 deallocates the IP addresses not listed in the PBU and sends back to MAG 120 a PBA with the list of currently allocated IP addresses. MAG 120 will use this indication as an additional confirmation of validity of the existing IP addresses that are not deleted. If any IP address that are not excluded from the original IP flow termination request is excluded in the PBA, then MAG 120 may treat it as an unsolicited IP address release by LMA 130. At step 840, MAG 120 terminates all IP flows requested by the mobile device and those requested by LMA 130. At step 850, MAG 120 determines whether any IP flows remain active in the current PMIP session. At step 860, MAG 120 may close the current PMIP session if there are no active IP flows are associated therewith.

Figure 9:
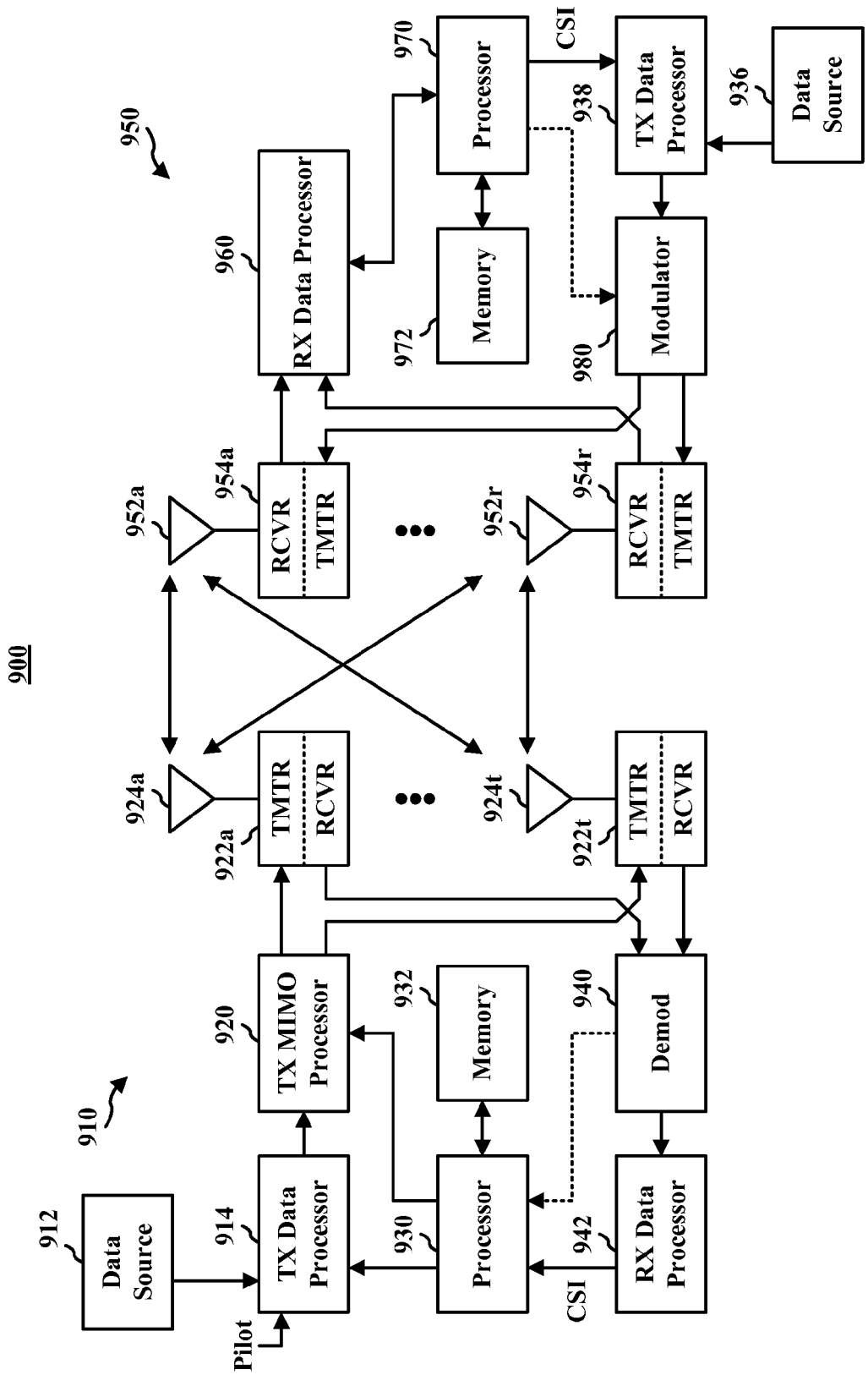
FIG. 9 is an illustration of a wireless communication system in accordance with various aspects of the invention set forth herein.

FIG. 9 shows one non-limiting example of a wireless communication system 900 in which the present aspects of the invention may be implemented. The wireless communication system 900 depicts one base station/forward link transmitter 910 in a radio access network and one mobile device 950 for sake of brevity. However, it is to be appreciated that system 900 can include more than one base station/forward link transmitter and/or more than one mobile device, wherein additional base stations/transmitters and/or mobile devices can be substantially similar or different from example base station/forward link transmitters 910 and mobile device 950 described below. In addition, it is to be appreciated that base station/forward link transmitter 910 and/or mobile device 950 can employ the systems (FIG. 1) and/or methods (FIGS. 2 and 4-8) described herein to facilitate wireless communication there between.

At base station/forward link transmitter 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides NT modulation symbol streams to NT transmitters (TMTR) 922*a* through 922*t*. In various aspects, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 922*a* through 922*t* are transmitted from NT antennas 924*a* through 924*t*, respectively.

At mobile device 950, the transmitted modulated signals are received by NR antennas 952*a* through 952*r* and the received signal from each antenna 952 is provided to a respective receiver (RCVR) 954*a* through 954*r*. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the NR received symbol streams from NR receivers 954 based on a particular receiver processing technique to provide NT "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station/forward link transmitter 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station/forward link transmitter 910.

At base station/forward link transmitter 910, the modulated signals from mobile device 950 can be received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights. It is to be appreciated that in the case of a forward link transmitter 910, as opposed to a base station, these RX components may not be present since data is only broadcasted over the forward link.

Processors 930 and 970 can direct (e.g., control, coordinate, manage, etc.) operation at base station/forward link transmitter 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the aspects of the invention described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects of the invention are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means known in the art.

Figure 10:
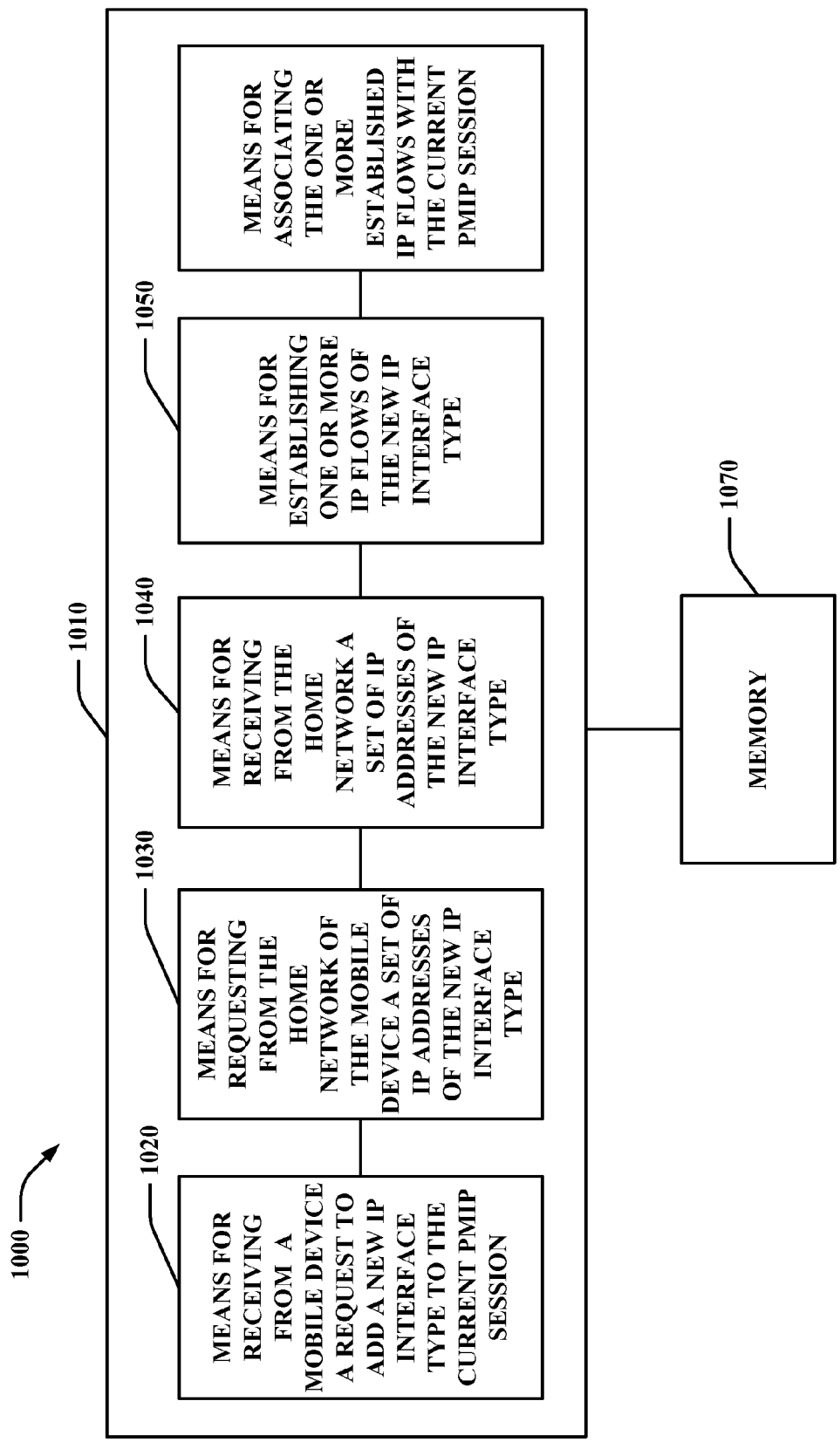
FIG. 10 is an illustration of an example system for dynamically managing IP connections in a wireless communication environment.

Turning to FIG. 10, illustrated is a system 1000 that may be implemented in a mobile access gateway for dynamically managing IP connections for a mobile device. As depicted, system 1000 includes functional blocks that can represent functions implemented by a processor, software, or combination thereof (e.g., firmware). System 1000 includes a logical grouping 1010 of electrical components that facilitate managing IP connections. Logical grouping 1010 can include means 1020 for receiving from a mobile device a request to add a second IP interface type to a current communication session with a first IP interface type. Furthermore, logical grouping 1010 includes means 1030 for requesting from the home network of the mobile device a set of IP addresses of the second IP interface type requested by the mobile device. Furthermore, logical grouping 1010 includes means 1040 for receiving from the home network a set of IP addresses of the second IP interface type. In addition, logical grouping 1010 includes means 1050 for establishing one or more IP flows of the second IP interface type using one or more received IP addresses. Lastly, logical grouping 1010 includes means 1060 for associating the one or more IP flows of the second IP interface type with the current communication session for the mobile device. Additionally, system 1000 can include a memory 1070 that retains instructions for executing functions associated with electrical components 1020-1060. While shown as being external to memory 1070, it is to be understood that electrical components 1020-1060 can exist within memory 1070.

Figure 11:
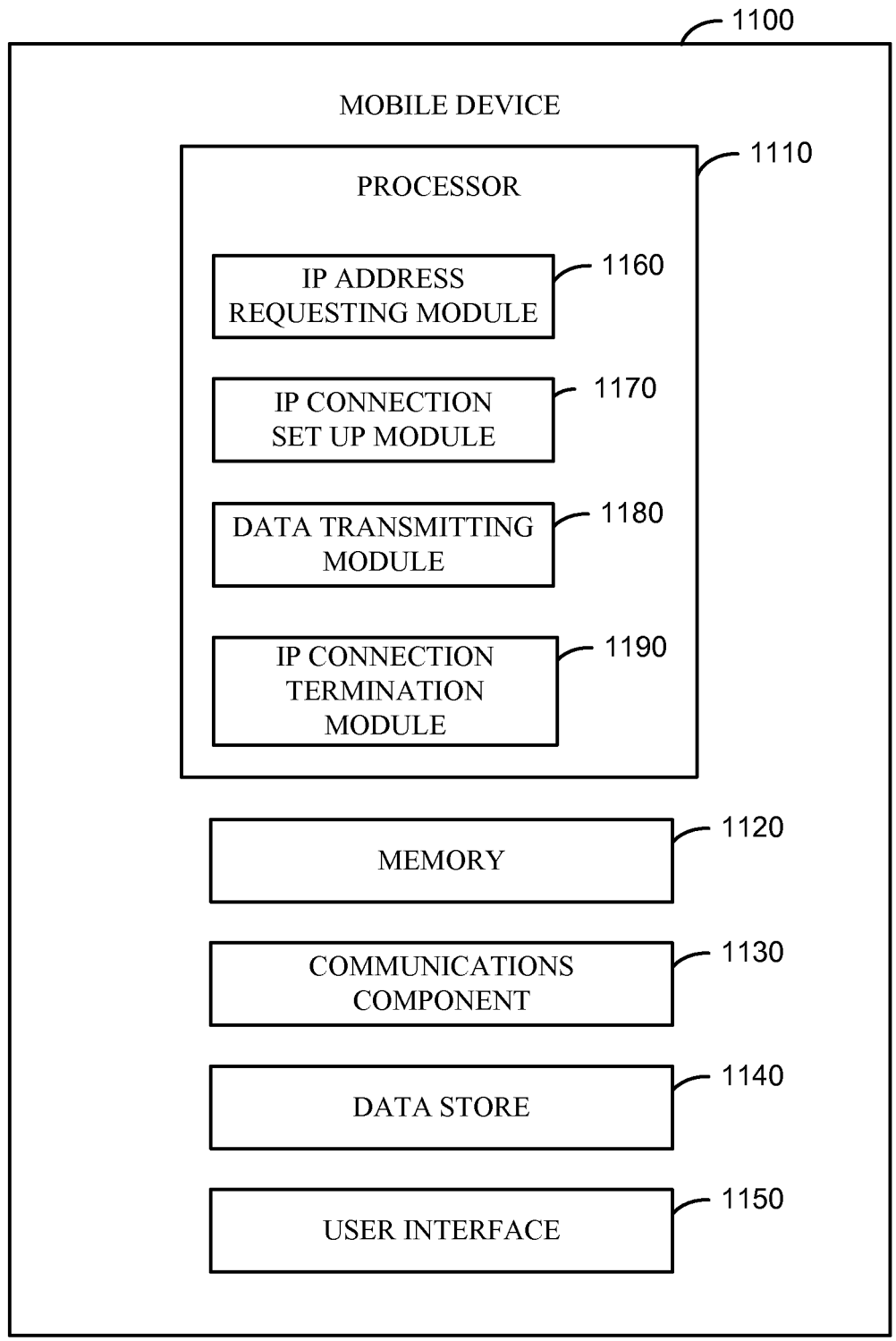
FIG. 11 is an illustration of an example mobile device operable to dynamically add/release IP connections in a wireless communication environment.

FIG. 11 illustrates an example mobile device 1100 operable to dynamically add and delete IP connections in accordance with methodologies disclosed herein. Mobile device 1100 includes a processor 1110 for carrying out processing functions associated with one or more of components and functions described herein. Processor 1110 can include a single or multiple set of processors or multi-core processors. Mobile device 1100 further includes a memory 1120 coupled to processor 1110, such as for storing local versions of applications being executed by processor 1110. Memory 1120 can include any type of memory usable by a computer, such as random access memory (RAM), read only memory (ROM), magnetic discs, optical discs, volatile memory, non-volatile memory, and any combination thereof.

Further, mobile device 1100 includes a communications component 1130 coupled to processor 1110 for establishing and maintaining communications with one or more radio access networks utilizing hardware, software, and services as described herein. For example, communications component 1130 may include transmit chain components and receive chain components associated with a transmitter and receiver, respectively, operable for interfacing with external radio networks and devices. Additionally, mobile device 1100 may further include a data store 1140 coupled to processor 1110, which can be any suitable combination of hardware and/or software, that provides for mass storage of information, databases, and programs employed in connection with aspects of the invention described herein. For example, data store 1140 may be a data repository for applications not currently being executed by processor 1110.

Mobile device 1100 may include a user interface component 1150 coupled to processor 1110 and being operable to receive inputs from a user of mobile device 1100 and further operable to generate outputs for presentation to the user. User interface component 1150 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1150 may include one or more output devices, including but not limited to a display, a speaker, a haptic feedback mechanism, a printer, any other mechanism capable of presenting an output to a user, or any combination thereof.

In one example aspect, processor 1110 includes an IP address requesting module 1160 operable to instruct communications component 1130 to transmit IPCP-Config-Req and/or IPv6CP-Config-Req messages to the mobile access gateway. Processor 1110 may also include a IP connection set up module 1170 operable to negotiate with an access radio network one or more IP flow (e.g., RLP flow) for various IP interface types. Processor 1110 may further include a data transmission module for instructing communications component 1130 to transmit packets through the negotiated IP flow to the appropriate local mobility anchor. Processor 1110 may also include an IP connection termination module for instructing communication component 1130 to transmit connection termination packet sequence to the mobile access gateway. Processor 1110 may include other modules for facilitating dynamic management of IP connection in accordance with methodologies disclosed herein.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects of the invention, it should be noted that various changes and modifications could be made herein without departing from the scope of the described aspects of the invention as defined by the appended claims. Furthermore, although elements of the described aspects of the invention may be described or claimed in the singular, the plural is contemplated unless limitation to the singular is explicitly stated. Additionally, all or a portion of any aspect of the invention may be utilized with all or a portion of any other aspect of the invention, unless stated otherwise.

What is claimed is:

1. A method for mobile communications, the method comprising:

receiving from a mobile device a request to add a second IP interface type to a current communication session associated with a first IP interface type, wherein the second IP interface type is different from the first IP interface type;

requesting from a local mobility anchor (LMA) associated with the home network of the mobile device a set of IP addresses of the second IP interface type;

receiving from the LMA a set of IP addresses of the second IP interface type;

establishing for the mobile device one or more IP flows of the second IP interface type using one or more received IP addresses;

associating the one or more new connections of the second IP interface type with the current communication session for the mobile device;

receiving from the mobile device a request to terminate one or more IP flows;

generating a proxy binding update (PBU) message listing one or more IP addresses associated with active IP flows and listing one or more excluded IP addresses associated with the one or more terminated IP flows, wherein the listing of one or more excluded IP addresses from the PBU message indicates that the one or more excluded IP addresses are released;

sending the generated PBU message to the LMA associated with the home network of the mobile device;
receiving from the LMA a proxy binding acknowledgement (PBA) message with a list of IP addresses remaining allocated to the mobile device;
determining if one or more IP addresses that were not excluded in the PBU message are excluded in the PBA message, and treating the one or more IP addresses excluded in the PBA message as an unsolicited IP address release by the LMA; and
releasing the one or more IP addresses excluded in the PBU message and the one or more IP addresses excluded in the PBA message.

2. The method of claim 1, wherein the first IP interface type is an
IPv4 interface type and the second IP interface type is an IPv6 interface type.

3. The method of claim 1, wherein the current communication session includes at least one Proxy Mobile Internet Protocol (PMIP) tunnel between a mobile access gateway (MAG) associated with a foreign network to which the mobile device is currently connected and the LMA associated with the home network of the mobile device.

4. The method of claim 1, wherein receiving from the mobile device a request to add the second IP interface type to the current communication session associated with a first IP interface type of the mobile device includes receiving from the mobile device one of an IPCP-Config-Req message and an IPv6CP-Config-Req message, the message including an indicator of the second IP interface type.

5. The method of claim 1, wherein requesting from the home network of the mobile device a set of IP addresses includes generating another PBU message having a vendor specific option associated with the second IP interface type.

6. The method of claim 1, wherein requesting from the home network of the mobile device a set of IP addresses includes generating an extended PBU message having a plurality of standard Home Network Prefix options, wherein a least one of the plurality of standard Home Network Prefix options identifies all IP addresses associated with the first IP interface type and a least one of the plurality of standard Home Network Prefix options includes an ALL_ZERO value for IP addresses associated with the second IP interface type.

7. the method of claim 1, wherein associating an IP flow of the second IP interface type with the current communication session includes associating the connection with a PMIP tunnel for the current communication session.

8. The method of claim 1, wherein associating an IP flow for the second IP interface type with the current communication session includes creating a new PMIP tunnel for the second IP interface type and associating the IP flow with the new PMIP tunnel.

9. A wireless communication system, comprising:
A processor and a communications component coupled to the processor, the processor being configured to
receive from a mobile device a request to add a second IP interface type to a current communication session with a first IP interface type of the mobile device, wherein the second IP interface type is different from the first IP interface type;
request from a local mobility anchor (LMA) associated with the home network of the mobile device a set of IP addresses of the second IP interface type;
receive from the LMA a set of IP addresses of the second IP interface type;
establish for the mobile device one or more IP flows of the second IP interface type using one or more received IP addresses;
associate the one or more IP flows of the second IP interface type with the current communication session for the mobile device;
receive from the mobile device a request to terminate one or more IP flows;
generate a proxy binding update (PBU) message listing one or more IP addresses associated with active IP flows and listing one or more excluded IP addresses associated with the one or more terminated IP flows, wherein the listing of one or more excluded IP addresses from the PBU message indicates that the one or more excluded IP addresses are released;
send the generated PBU message to the LMA associated with the home network of the mobile device;
receive from the LMA a proxy binding acknowledgement (PBA) message with a list of IP addresses remaining allocated to the mobile device;
determine if one or more IP addresses that were not excluded in the PBU message are excluded in the PBA message, and treat the one or more IP addresses excluded in the PBA message as an unsolicited IP address release by the LMA; and
release the one or more IP addresses excluded in the PBU message and the one or more IP addresses excluded in the PBA message.

10. The system of claim 9, wherein the first IP interface type is an IPv4 interface type and the second IP interface type is an IPv6 interface type.

11. The system of claim 9, wherein the current communication session includes at least one Proxy Mobile Internet Protocol (PMIP) tunnel between a mobile access gateway (MAG) associated with a foreign network to which the mobile device is currently connected and the LMA associated with the home network of the mobile device.

12. The system of claim 9, wherein to receive from the mobile device a request to add the second IP interface type to the current communication session associated with a first IP interface type of the mobile device, the processor being further configured to receive from the mobile device one of an IPCP-Config-Req message and an IPv6CP-Config-Req message, the message including an indicator of the second IP interface type.

13. The system of claim 9, wherein to request from the home network of the mobile device a set of IP addresses, the processor being further configured to generate another PBU message having a vendor-specific option identifying with the second IP interface type.

14. The system of claim 9, wherein to request from the home network of the mobile device a set of IP addresses, the processor being further configured to generate an extended PBU message having a plurality of standard Home Network Prefix options, wherein a least one of the plurality of standard Home Network Prefix options identifies all IP addresses associated with the first IP interface type and a least one of the plurality of standard Home Network Prefix options includes an ALL_ ZERO value for IP addresses associated with the second IP interface type.

15. The system of claim 9, wherein to associate an IP flow for the second IP interface type with the current communication session, the processor being further configured to associate the IP flow with a PMIP tunnel for the current communication session.

16. The system of claim 9, wherein to associate an IP flow for the second IP interface type with the current communication session, the processor being further configured to create a new PMIP tunnel for the second IP interface type and associating the IP flow with the new PMIP tunnel.

17. A computer program product, comprising:
a non-transitory computer-readable medium comprising:
a first set of codes for causing a computer to receive from a mobile device a request to add a second IP interface type to a current communication session with a first IP interface type, wherein the second IP interface type is different from the first IP interface type;
a second set of codes for causing a computer to request from a local mobility anchor (LMA) associated with the home network of the mobile device a set of IP addresses of the second IP interface type requested by the mobile device;
a third set of codes for causing a computer to receive from the LMA a set of IP addresses for the second IP interface type;
a fourth set of codes for causing a computer to establish one or more IP flows for the second IP interface type of the mobile device using one or more received IP addresses;
a fifth set of codes for causing a computer to associate the one or more IP flows for the second IP interface type with the current communication session for the mobile device;
a sixth set of codes for receiving from the mobile device a request to terminate one or more IP flows;
a seventh set of codes for generating a proxy binding update (PBU) message listing one or more IP addresses associated with active IP flows and listing one or more excluded IP addresses associated with the one or more terminated IP flows, wherein the listing of one or more excluded IP addresses from the PBU message indicates that the one or more excluded IP addresses are released;
an eighth set of codes for sending the generated PBU message to the LMA associated with the home network of the mobile device;
a ninth set of codes for receiving from the LMA a proxy binding acknowledgement (PBA) message with a list of IP addresses remaining allocated to the mobile device;
a tenth set of codes for determining if one or more IP addresses that were not excluded in the PBU message are excluded in the PBA message, and treating the one or more IP addresses excluded in the PBA message as an unsolicited IP address release by the LMA; and
an eleventh set of codes for releasing the one or more IP addresses excluded in the PBU message and the one or more IP addresses excluded in the PBA message.

18. The computer-readable medium of claim 17, wherein the first IP interface type is an IPv4 interface type and the second IP interface type is an IPv6 interface type.

19. The computer-readable medium of claim 17, wherein the current communication session includes at least one Proxy Mobile Internet Protocol (PMIP) tunnel between a mobile access gateway (MAG) associated with a foreign network to which the mobile device is currently connected and the LMA associated with the home network of the mobile device.

20. An apparatus, comprising:
means for receiving from a mobile device a request to add a second IP interface type to a current communication session with a first IP interface type of the mobile device, wherein the second IP interface type is different from the first IP interface type;
means for requesting from a local mobility anchor (LMA) associated with the home network of the mobile device a set of IP addresses of the second IP interface type requested by the mobile device;
means for receiving from the LMA a set of IP addresses for the second IP interface type;
means for establishing one or more IP flows for the second IP interface type of the mobile device using one or more received IP addresses;
means for associating the one or more IP flows for the second IP interface type with the current communication session for the mobile device;
means for receiving from the mobile device a request to terminate one or more IP flows;
means for generating a proxy binding update (PBU) message listing one or more IP addresses associated with active IP flows and listing one or more excluded IP addresses associated with the one or more terminated IP flows, wherein the listing of one or more excluded IP addresses from the PBU message indicates that the one or more excluded IP addresses are released;
means for sending the generated PBU message to the LMA associated with the home network of the mobile device;
means for receiving from the LMA a proxy binding update acknowledgement (PBA) message with a list of IP addresses remaining allocated to the mobile device;
means for determining if one or more IP addresses that were not excluded in the PBU message are excluded in the PBA message, and treating the one or more IP addresses excluded in the PBA message as an unsolicited IP address release by the LMA; and
means for releasing the one or more IP addresses excluded in the PBU message and the one or more IP addresses excluded in the PBA message.

21. The apparatus of claim 20, wherein the first IP interface type is an IPv4 interface type and the second IP interface type is an IPv6 interface type.

22. The apparatus of claim 20, wherein the current communication session includes at least one Proxy Mobile Internet Protocol (PMIP) tunnel between a mobile access gateway (MAG) associated with a foreign network to which the mobile device is currently connected and the LMA associated with the home network of the mobile device.

* * * * *